United States Patent
Tokura

Patent Number: 5,916,694
Date of Patent: Jun. 29, 1999

[54] MAGNETO-RESISTANCE ELEMENT

[75] Inventor: Kazuyoshi Tokura, Tokyo, Japan

[73] Assignee: NEC Corporation, Japan

[21] Appl. No.: 08/944,711

[22] Filed: Oct. 6, 1997

Related U.S. Application Data

[63] Continuation of application No. 08/355,672, Dec. 14, 1994, abandoned.

[30] Foreign Application Priority Data

Dec. 15, 1993 [JP] Japan ................................. 5-314763
Mar. 7, 1994 [JP] Japan ................................. 6-036170

[51] Int. Cl.$^6$ .............................................. G11B 05/127
[52] U.S. Cl. ..................... 428/611; 428/635; 428/692; 428/336; 428/448; 428/450; 428/900; 360/113; 338/32 R; 324/252
[58] Field of Search ............................. 428/611, 635, 428/692, 336, 448, 450, 900; 360/113; 338/32 R; 324/252

[56] References Cited

U.S. PATENT DOCUMENTS

| | | | |
|---|---|---|---|
| 4,778,721 | 10/1988 | Sliemers et al. | 428/336 |
| 5,017,403 | 5/1991 | Pang et al. | 427/39 |
| 5,051,380 | 9/1991 | Maeda et al. | 437/238 |
| 5,094,983 | 3/1992 | Fürthaler et al. | 437/225 |
| 5,319,247 | 6/1994 | Matsuura | 257/760 |
| 5,401,542 | 3/1995 | Kitada et al. | 427/566 |
| 5,459,108 | 10/1995 | Doi et al. | 437/238 |
| 5,466,495 | 11/1995 | Pronk et al. | 427/576 |

FOREIGN PATENT DOCUMENTS 63-310186 12/1988 Japan .
1-200683 8/1989 Japan .

OTHER PUBLICATIONS

Kobayashi, et al., "A Technique for Flattening of Inter-Layer Insulating Films", Applied Physics (in Japanese), vol. 61, No. 11, Nov. (1992).

K. Fujino, et al., "Low Temperature, Atmospheric Pressure CVD Using Hexamethyldisiloxane and Ozone", J. Electrochem. Soc., vol. 139, No. 8, Aug. 1992, pp. 2282–2287.

*Primary Examiner*—Stevan A. Resan
*Attorney, Agent, or Firm*—Ostrolenk, Faber, Gerb & Soffen, LLP

[57] ABSTRACT

A silicon dioxide passivation film highly resistant to humidity is formed to prevent the deterioration of the magnetic effects, to increase the resistance variation rate and to reduce the internal stresses of the ferromagnetic metal film of the MR element. After forming the ferromagnetic metal film, the silicon dioxide film is formed by a TEOS-$O_3$-based atmospheric pressure CVD method in a state where the substrate temperature is kept at or below 350° C. The silicon dioxide film is not doped with phosphorus and sits thickness is kept within 1 $\mu$m. On the other hand, apart from the above-described structure, the silicon dioxide film may as well consist of two layers, one doped with and the other not doped with phosphorus. Another method used to form the silicon dioxide film is an HMDS-$O_3$-based atmospheric pressure CVD method. As film formation is thereby possible at a substrate temperature of not more than 300° C., the magnetic effects of the ferromagnetic metal film are prevented from deterioration.

8 Claims, 5 Drawing Sheets

2

MAGNETO-RESISTANCE ELEMENT

This is a Continuation of application Ser. No. 08/355,672 filed on Dec. 14, 1994 now abandoned.

BACKGROUND OF THE INVENTION

The present invention relates to a magneto-resistance element (MR element) utilizing magneto-resistance effect, and more particularly to the structure of a passivation film for protecting the MR element, together with a manufacturing method thereof.

MR elements are magnetic transducers utilizing the phenomenon that the electric resistance of a ferromagnetic magneto-resistance film varies with the relative intensity and direction of the magnetic field and, by virtue of their small size and high sensitivity, are extensively used as magnetic sensors and magnetic heads for playback use.

Silicon dioxide passivation films formed by any conventional method involves the following problems. First, after a ferromagnetic metal film and a silicon dioxide film are formed into the substrate film, much of its magnetic effect is lost, and the essentially expected characteristics of the MR element, especially its resistance variation rate, deteriorate during the manufacturing process.

Second, the product is susceptible to many defects due to pinholes and cracks in the passivation film, difficult to effectively protect from humidity, and unstable in electrical characteristics. As a result, the manufacturing yield is very low.

Third, the ferromagnetic metal film consisting of NiFe, Au and Cr gives rise to a level gap from the substrate surface. For this reason, in order to coat the gap part as well with the passivation film, a thickness of about 2 µm is required for the passivation film. As a consequence, in the case of a conventional MR element shown in FIG. 1 for example, if the substrate 21 is coated with a passivation film 25 of 4 µm, the parts near the sides of the ferromagnetic metal film 22 will be coated in a thickness of only about 0.5 µm at most, resulting in a lack of uniformity. Moreover, a relatively thick and non-uniform film is susceptible to stresses, which might invite changes in the characteristics of the MR element.

An MR element embodying an attempt to solve the second and third among the above-mentioned problems is described in the Gazette of the Japanese Patent Laid-open No. 310186 of 1988. The idea is to reduce the film thickness and ease the stresses within the film by uniformly forming the silicon dioxide film by the use of plasma chemical vapor deposition (CVD). Regarding the first problem, however, even the cause is not identified, and the formation of the silicon dioxide film by plasma CVD is unable to solve the first problem.

SUMMARY OF THE INVENTION

An object of the present invention is to provide an MR element having a passivation film which can effectively protect the metal film without reducing the magnetic effects or subjecting the metal film part to any external loads such as stresses, and a manufacturing method for such MR elements.

An MR element according to the invention comprises a magnetic film having magneto-resistance effect which is formed over the substrate. The surface of the substrate is coated with a silicon dioxide film. The silicon dioxide film is formed by a TEOS-$O_3$-based atmospheric pressure CVD method in a state where the substrate temperature is kept at or below 350° C.

The present invention, providing the above-described configuration, may include the silicon dioxide film which is not doped with phosphorus and whose thickness is not more than 1 µm.

The invention may also comprise the silicon dioxide film having two layers, one doped and the other not doped with phosphorus, and the total thickness of the double-layered silicon dioxide film is not more than 2 µm.

The invention may as well be characterized by another method to form the silicon dioxide film, i.e. one using a hexamethyldisiloxane-$O_3$-based (HMDS-$O_3$-based) atmospheric pressure CVD method, more particularly film formation in a state where the substrate temperature is kept at or below 300° C.

Of the problems involved in the prior art, the first-mentioned one, concerns the substrate temperature at which the silicon dioxide passivation film is formed. Thus, a higher substrate temperature would result in improved adhesion of the film to the substrate, but the magnetic effects, especially the resistance variation rate, of the ferromagnetic metal film would heavily deteriorate. The conventional film formation method has to set the substrate temperature at no less than 400° C., but the magnetic effects of ferromagnetic metal films rapidly drop at high temperature, especially from the range of 300 to 350° C. on. Therefore, in order to keep the performance characteristics satisfactory, it is indispensable to form the silicon dioxide film generally at or below 350° C.

The MR element according to the invention, because its silicon dioxide passivation film is formed by a TEOS-$O_3$-based atmospheric pressure CVD method with the substrate temperature being kept at no more than 350° C., is immune from the deterioration of magnetic effects. Since, moreover, the silicon dioxide film is uniformly formed, the film thickness can be reduced to 2 µm or less in a humidity-resistant state free from pinholes and dust adhesion, and accordingly no stress occurs within the film.

By another method, an HMDS-$O_3$-based atmospheric pressure CVD method, film formation is possible at 300° C. or below, and even superior performance characteristics can be thereby ensured.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENTS

Figure 1:
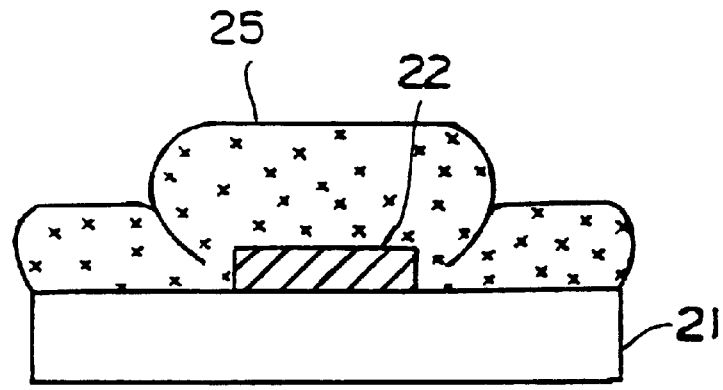
FIG. 1 shows a vertical cross section of an MR element according to the prior art.

With a view to facilitating the understanding of the present invention, an MR element according to the prior art will be described first. The prior art MR element, as illustrated in FIG. 1, has a structure in which a ferromagnetic film 22 consisting of three layers of permalloy (NiFe), gold (Au) and chromium (Cr) is formed over a substrate 21 whose surface is coated with silicon dioxide ($SiO_2$) or SiON. Over the surface of the substrate 21 is further formed a silicon dioxide passivation film 25 to protect said ferromagnetic metal film 22 from humidity and the like.

The manufacturing method for the MR element having the above-described structure will be described further. As the material of the substrate 21, silicon is usually chosen, but glass or something else may be used as well. Over the surface of this silicon substrate 21 is formed in advance an $SiO_2$ film by thermal oxidation or otherwise. Then films of NiFe, Au and Cr are successively formed in the same vacuum by sputtering or vapor deposition using an electron gun (E-gun) or the like. After than, a desired pattern of MR element is formed in said three layers of metal films by photolithography and etching. Further to protect the pattern in the metal films, the silicon dioxide passivation film 25 is formed over the surface of the substrate 21 by sputtering. After the whose surface of the substrate 21 is coated with the silicon dioxide passivation film 25 all over, the electrode terminal parts for bonding are removed by etching. Finally, the substrate 21 is cut into individual chips, each of which is accommodated into a package, and the manufacturing process is completed by bonding the electrode terminals (e.g. the Gazette of the Japanese Patent Laid-open No. 200683 of 1989).

Usually the metal film part (not shown) of an MR element is 0.5 to 1 μm thick overall in order to ensure its magnetic effects. Therefore, for complete coating of the metal films, the silicon dioxide passivation film 25 has to be about 4 μm thick.

Next will be described in detail a preferred embodiment of the present invention with reference to drawings.

Figure 2:
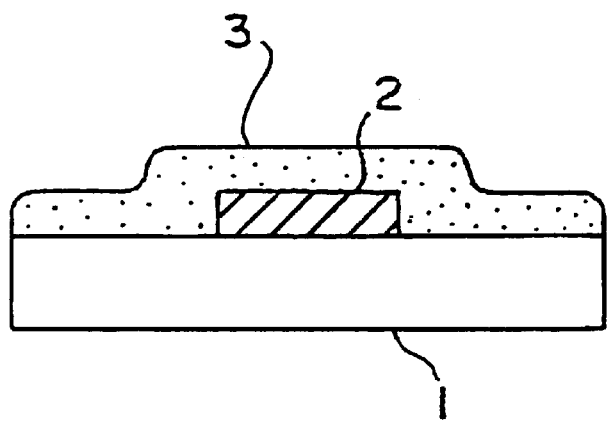
FIG. 2 shows a cross section of an MR element (not doped with phosphorus), which is a preferred embodiment of the invention.

FIG. 2 shows a cross section of an MR element, which is the preferred embodiment of the invention. Over the surface of a silicon substrate 1 is formed in advance an $SiO_2$ film by thermal oxidation. Description of the formation of a ferromagnetic metal film is dispensed with here because it is accomplished by the same method as the prior art.

After the formation of the ferromagnetic metal film, a silicon dioxide ($SiO_2$) passivation film 3 is formed by a TEOS-$O_3$-based atmospheric pressure CVD method. In this embodiment, the $SiO_2$ passivation film 3 is not doped with phosphorus. For the MR element according to the invention, the formation of said $SiO_2$ passivation film 3 is accomplished under the following conditions.

| Substrate temperature: | 275° C. |
|---|---|
| Reaction gas flow rate: | Si - 0.35 SLM |
| | $O_2$ - 7.5 SLM |
| | $N_2$ - 18 SLM |

Here SLM represents the gas flow rate per $cm^3$. For the TEOS-$O_3$-based atmospheric pressure CVD method to be used for the formation of the silicon dioxide film, reference may be made to, for instance, Kobayashi et al., "A Technique for Flattening of Inter-layer Insulating Films", Applied Physics (in Japanese), Vol. 61, No. 11 (1992).

In the cross section of the MR element manufactured by the method according to the invention, as illustrated in FIG. 2, there is little difference between the thickness of the passivation film over the top face and that over the sides of the ferromagnetic metal film even if there is a gap of level between the part where the pattern of the ferromagnetic metal film is formed and those where the pattern is not formed, and the passivation film adheres uniformly.

Figure 3:
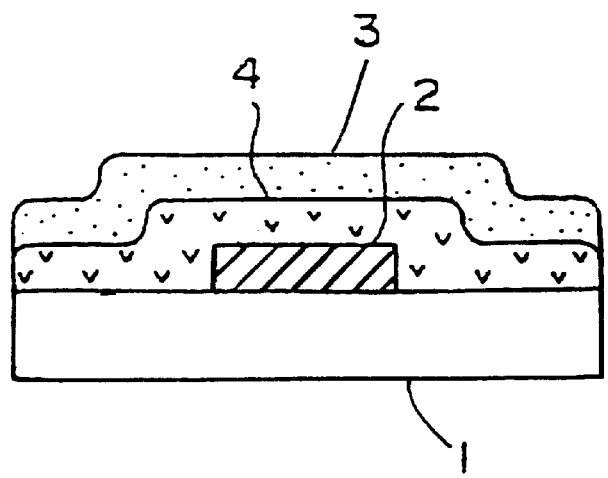
FIG. 3 shows a cross section of an MR element (doped with phosphorus), which is another preferred embodiment of the invention.
Figure 4:
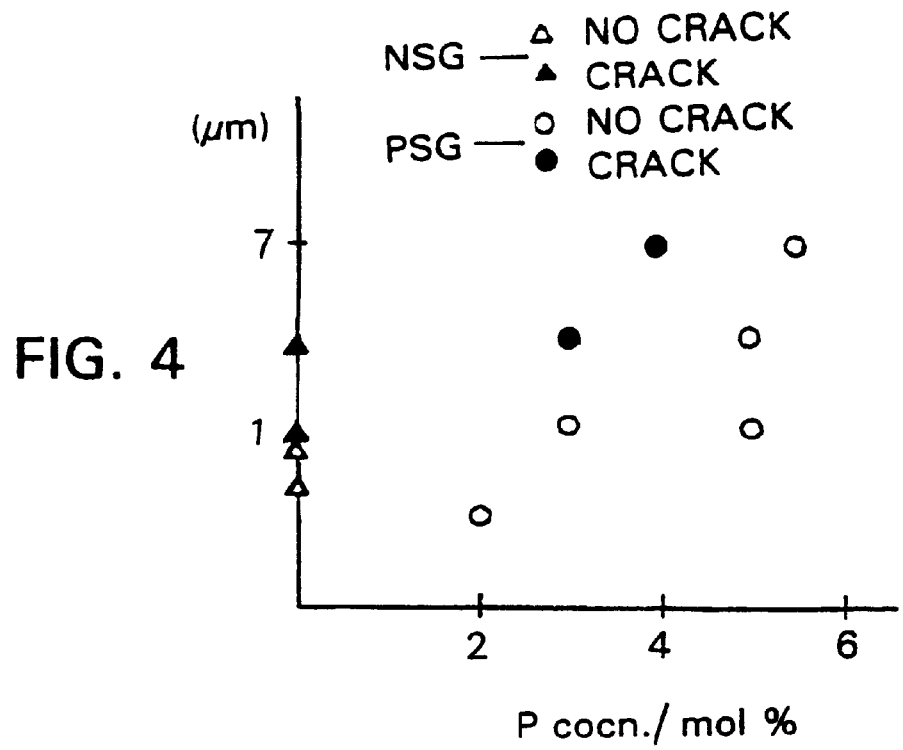
FIG. 4 is a diagram showing the presence or absence of cracks in the silicon dioxide passivation film formed by a TEOS-$O_3$-based atmospheric pressure CVD method, depending on the concentration of doping phosphorus and the film thickness both of which were varied.

Next will be described another embodiment of the present invention, which is an MR element having a passivation film containing a phosphorus-doped silicon dioxide film. The silicon dioxide film is formed by the same TEOS-$O_3$-based atmospheric pressure CVD method as for the above-described first embodiment. In this second embodiment, as illustrated in FIG. 3, first a phosphorus-doped $SiO_2$ passivation film 4 is formed, over which another $SiO_2$ passivation film 3, not doped with phosphorus, is further formed. The conditions of formation for the $SiO_2$ passivation film 3 are the same as stated above, and the film 4 is formed while doping phosphorus gas is being supplied at a flow rate of 0.4 SLM.

In the first embodiment where no doping with phosphorus is used, no crack will occur if the film thickness is no more than about 1 μm. Where doping with phosphorus is used, the film thickness can be increased to about 2 μm without the risk of inviting cracks if the phosphorus concentration is sufficiently high. Therefore, in order to increase resistance to humidity, the film can be thickened to about 2 μm while keeping the phosphorus concentration sufficiently high.

Figure 5:
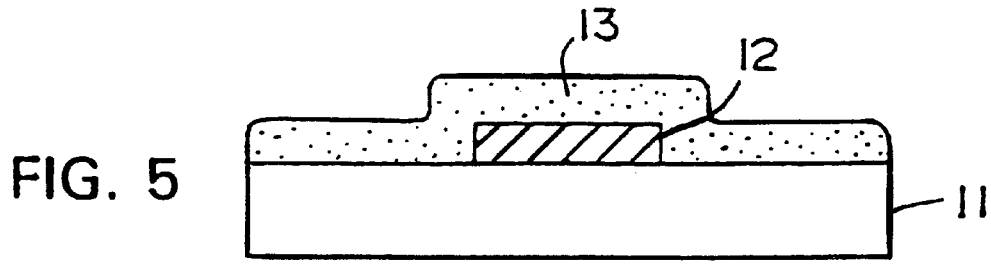
FIG. 5 shows a cross section of an MR element (not doped with phosphorus), which is still another preferred embodiment of the invention.

Next will be described a case in which another method according to the invention is applied to the formation of the silicon dioxide film. FIG. 5 shows a cross section of an MR element, which is another preferred embodiment of the invention. An $SiO_2$ film is formed in advance over the surface of a silicon substrate 11 by thermal oxidation. A ferromagnetic metal film 12 is further formed over the $SiO_2$ film, but the description of its structure and formation method is dispensed with here because they are the same as according to the prior art.

In this embodiment, a silicon dioxide passivation film 13 is formed under the following conditions by the HMDS-$O_3$-based atmospheric pressure CVD method after the formation of the ferromagnetic metal film.

| | |
|---|---|
| Substrate temperature: | 260° C. |
| Reaction gas flow rate: | Si - 1.2 SLM |
| | $O_2$ - 7.5 SLM |
| | $N_2$ - 18 SLM |

Here SLM represents the gas flow rate per $cm^3$. Incidentally, the silicon dioxide passivation film 13 is not doped with phosphorus.

For the HMDS-$O_3$-based atmospheric pressure CVD method mentioned above, reference may be made to, for instance, K. Fujino et al., "Low Temperature, Atmospheric Pressure CVD Using Hexamethyldisiloxane and Ozone", J. Electrochem. 139.2282 (1992).

Again in the cross section of this embodiment, as illustrated in FIG. 5, there is no difference between the thickness of the passivation film over the top face and that over the sides of the ferromagnetic metal film even if there is a gap of level between the part where the pattern of the ferromagnetic metal film is formed and those where the pattern is not formed, and the passivation film adheres uniformly.

Figure 6:
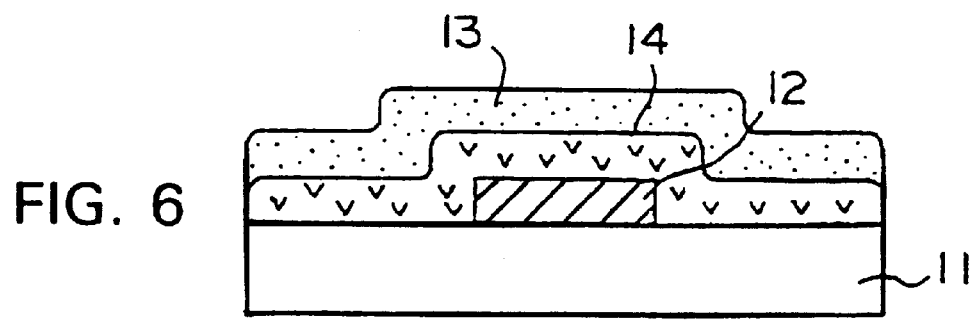
FIG. 6 is a cross section of an MR element (doped with phosphorus), which is yet another preferred embodiment of the invention.

Next will be described a case in which a phosphorus-doped silicon dioxide film is added in the formation process of a silicon dioxide film by the HMDS-$O_3$-based atmospheric pressure CVD method according to the present invention. The silicon dioxide film is formed by the same HMDS-$O_3$-based atmospheric pressure CVD method as for the above-described embodiment. In this embodiment, as illustrated in FIG. 6, first a phosphorus-doped $SiO_2$ film 14 is formed, over which another $SiO_2$ film 13, not doped with phosphorus, is further formed. The conditions of formation for different layers are the same as those for the foregoing embodiment for films not doped with phosphorus, and films to be doped with phosphorus are formed while doping phosphorus gas is being supplied at a flow rate of 0.4 SLM.

Figure 7:
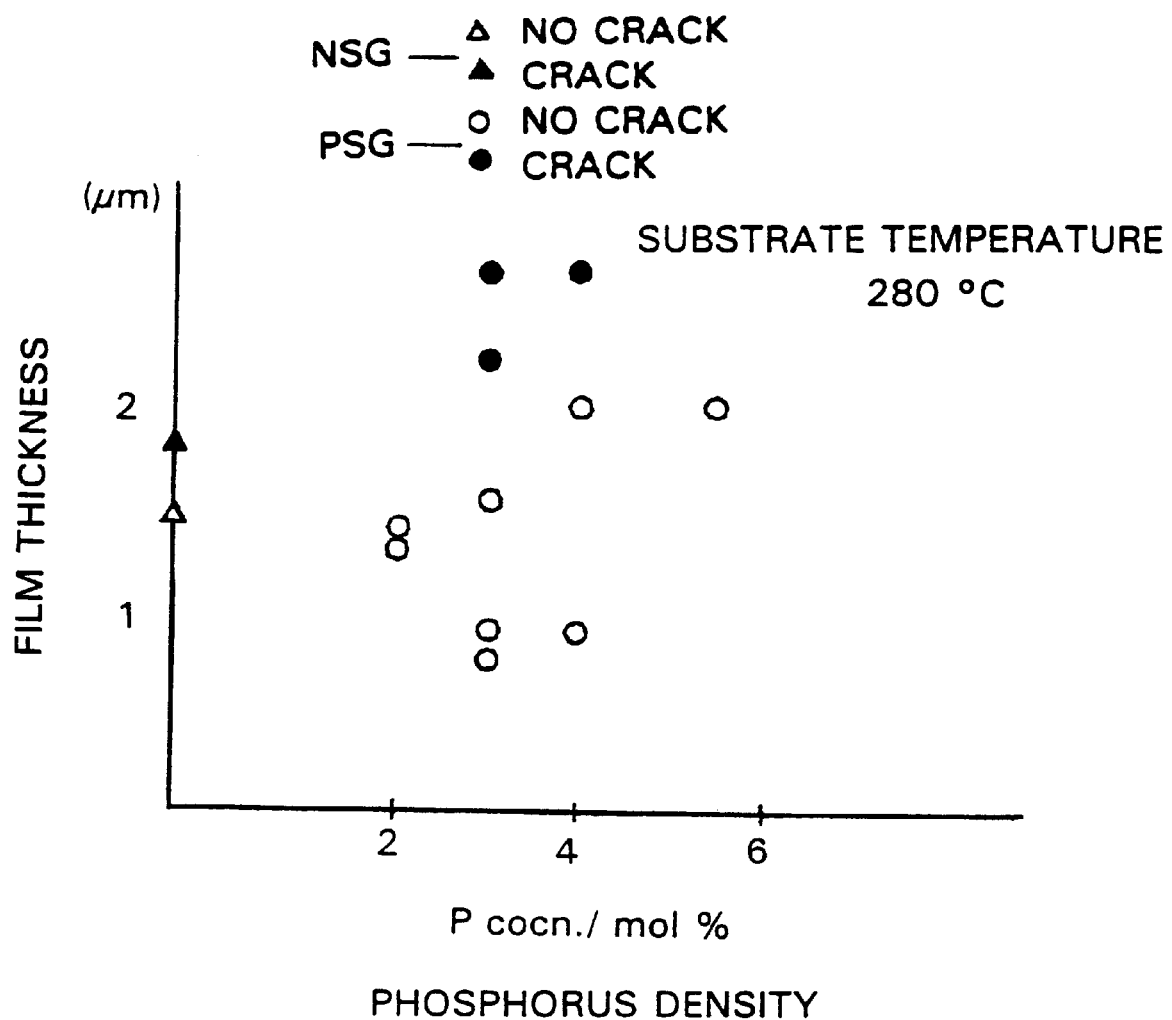
FIG. 7 is a diagram showing the presence or absence of cracks in the silicon dioxide passivation film formed by a HMDS-$O_3$-based atmospheric pressure CVD method, depending on the concentration of doping phosphorus and the film thickness both of which were varied.

Next will be explained the relevance of film thickness in the MR element according to the present invention to the occurrence of cracks within the film. FIG. 7 is a diagram showing the presence or absence of cracks in the silicon dioxide passivation film formed by a HMDS-$O_3$-based atmospheric pressure CVD method among the different manufacturing methods according to the invention, and indicating the relevance of the conditions of doping with phosphorus to the cracks. As is evident from the diagram, while no crack occurs in the first embodiment without doping with phosphorus if the film thickness is no more than 1.5 μm, the occurrence of cracks is prevented in the phosphorus-doped film by increasing the phosphorus concentration if the film thickness is kept at about 2 μm or less. Therefore, since a thicker film is more advantageous for resistance to humidity, it is more advisable to use doping with phosphorus.

Figure 8:
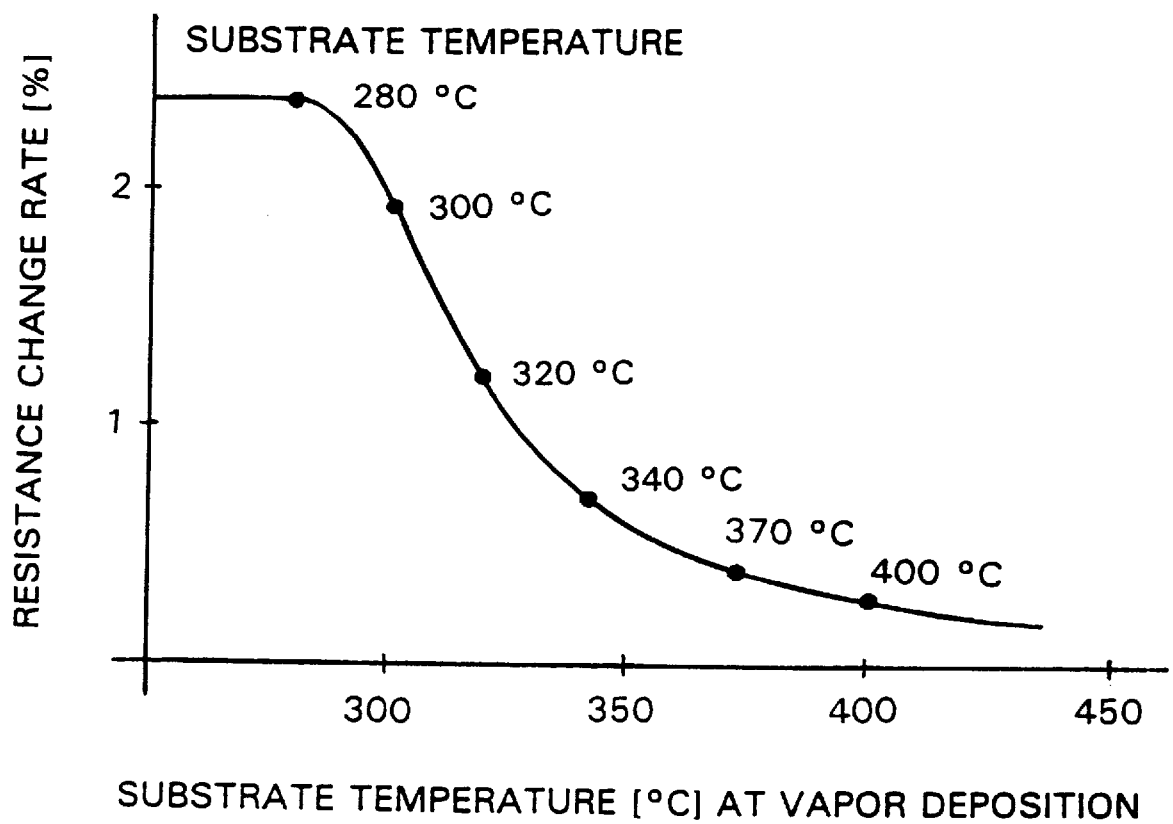
FIG. 8 is a diagram showing the relationship between the substrate temperature at the time of the formation of the passivation film and the resistance variation rate of the ferromagnetic metal film after the formation of the passivation film.

Now will be explained the relevance of the substrate temperature at the time of the formation of the silicon dioxide films 13 and 14 by the manufacturing methods according to the invention. FIG. 8 is a diagram showing the relationship between the substrate temperature at the time of the formation of the aforementioned silicon dioxide film and the resistance variation rate after the film formation. As is evident from FIG. 8, the magnetic effects of the ferromagnetic metal film steeply drop, and the resistance variation rate decreases, if the substrate temperature is higher than the range of 300 to 350° C.

It is therefore seen that, in order to maintain high magnetic effects after the formation of the ferromagnetic metal film, it is indispensable not to let the substrate temperature rise above the range of 300 to 350° C. in the subsequent stages of the manufacturing process. Therefore, the plasma CVD method according to the prior art, because of the higher substrate temperature involved, cannot provide a silicon dioxide film of the desired quality free from the deterioration of magnetic effects. On the other hand, the TEOS-$O_3$-based atmospheric pressure CVD method used in manufacturing according to the present invention enables a silicon dioxide film of satisfactory quality to be formed at a substrate temperature of no more than 350° C., and accordingly is less susceptible to the deterioration of magnetic effects than the prior art. Furthermore, as the HMDS-$O_3$-based atmospheric pressure CVD method makes it possible to form a sufficiently adhesive silicon dioxide film in a state where the substrate temperature is kept at or below 280° C., the magnetic effects can be maintained substantially as they are before the film formation.

Figure 9:
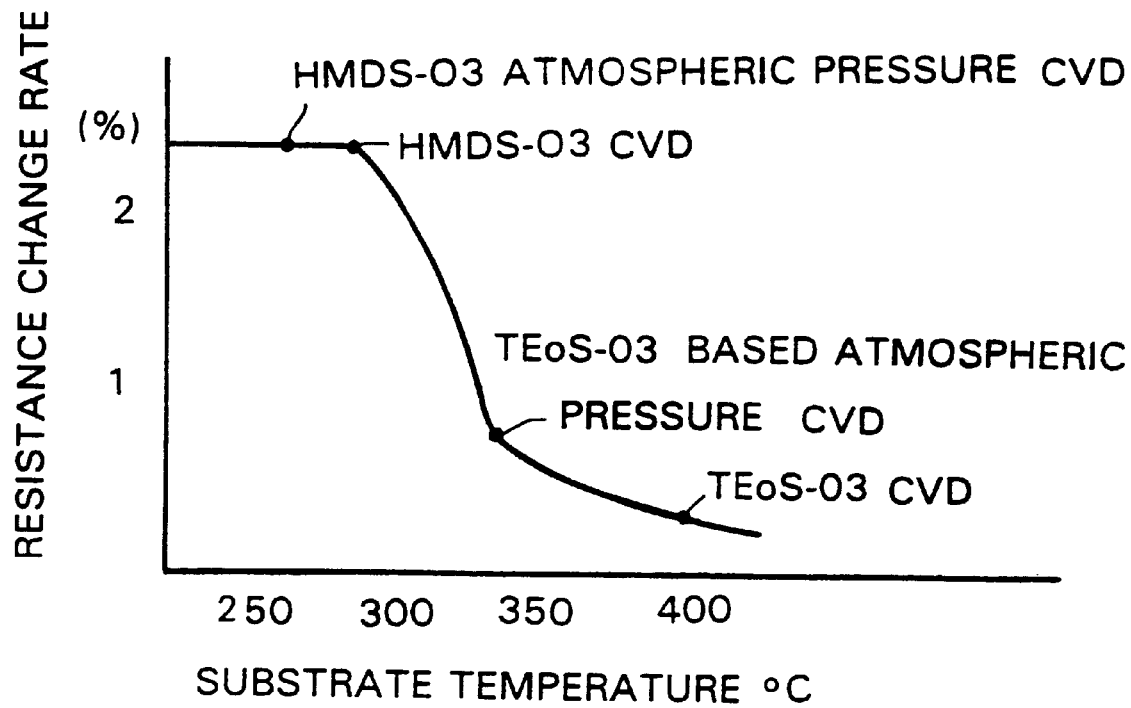
FIG. 9 is a diagram showing the relationship between the substrate temperature at the time of the formation of the silicon dioxide film by each of the TEOS-$O_3$-based atmospheric pressure CVD methods or the HMDS-$O_3$-based atmospheric pressure CVD methods and the resistance variation rate of the ferromagnetic metal film.

FIG. 9 is a diagram showing the result of checking the change in magnetic resistance rate from before to after the film formation when the silicon dioxide film was formed by each of the TEOS-$O_3$-based atmospheric pressure CVD methods or the HMDS-$O_3$-based atmospheric pressure CVD methods with the substrate temperature being varied within a range in which a sufficiently adhesive film could be obtained. By the TEOS-$O_3$-based atmospheric pressure CVD method, the substrate temperature needed to be kept at about 330° C. or above in order to let a sufficiently adhesive film to be formed. The resistance variation rate at 330° C. was found to be about 0.8%, much improved over the around 0.2% achieved by the prior art. Meanwhile, the HMDS-$O_3$-based atmospheric pressure CVD method gave a sufficient degree of adhesiveness even at a substrate temperature of as low as 280° C., and it is seen that film formation at this substrate temperature was susceptible to no deterioration in magnetic effects, with the resistance variation rate hardly changing from before to after the film formation.

These findings indicate that, in order to solve the problem identified at the beginning and to enable a highly reliable and well performing crack-free silicon dioxide passivation film to be formed at a low substrate temperature without adversely affecting magnetic effects, it is advisable especially to use the HMDS-$O_3$-based atmospheric pressure CVD method, maintain the substrate temperature at or below 300° C. and form the silicon dioxide film to a thickness of about 2 μm, containing at least a phosphorus-doped layer.

As hitherto described, an MR element according to the present invention is produced by a TEOS-$O_3$-based atmospheric pressure CVD method with the passivation film to protect the ferromagnetic metal film being formed at a substrate temperature kept at 350° C. or below. Furthermore, as the passivation film would give sufficient resistance to humidity at a thickness of no more than 1 μm if not doped with phosphorous or no more than 2 μm if the film is double-layered, the ferromagnetic metal film is subject to no stress.

The invention also uses the HMDS-$O_3$-based atmospheric pressure CVD method as another way to form the silicon dioxide passivation film. By this method, which allows the film to be formed at a substrate temperature of as low as 300° C. or below, even superior magnetic effects can be achieved.

Thus, the present invention can provide MR elements superior in resistance to humidity and in performance features to those according to the prior art.

What is claimed is:

1. A magneto-resistance (MR) element comprising:
    a silicon substrate;
    a magnetic film having magnetoresistance effect on said substrate, said magnetic film consisting of a layer of NiFe, a layer of Au and a layer of Cr; and
    a TEOS-$O_3$-based atmospheric pressure chemical vapor deposition silicon dioxide film formed in at least the region of said substrate having said magnetic film, said silicon dioxide film formed where the temperature of said substrate was kept at or below 350° C.

2. An MR element, as claimed in claim 1, in which said silicon dioxide film was formed where said temperature was at or below 300° C.

3. An MR element, as claimed in claim 2, wherein said silicon dioxide film is a film which is not doped with phosphorus and whose thickness is not more than 1 $\mu$m.

4. An MR element, as claimed in claim 2, wherein said silicon dioxide film consists of two layers which are a phosphorus-doped silicon dioxide film and a silicon dioxide film not doped with phosphorus, and the total thickness of said double-layered silicon dioxide film is not more than 2 $\mu$m.

5. An Mr element which is a magnetic film having magneto-resistance effect on a silicon substrate whose surface at least in the region of said substrate having said magnetic film is coated with a silicon dioxide film,
    said silicon dioxide film having been formed by hexamethyldisiloxane-$O_3$-based atmospheric temperature chemical vapor deposition while keeping the substrate temperature at or below 300° C. and said magnetic film consisting of a layer of NiFe, a layer of Au and a layer of Cr.

6. An MR element, as claimed in claim 5, wherein said silicon dioxide film was formed at a temperature at or below 280° C.

7. An MR element, as claimed in claim 5, wherein said silicon dioxide film is a film which is not doped with phosphorus and whose thickness is not more than 2 $\mu$m.

8. An MR element, as claimed in claim 5, wherein said silicon dioxide film consists of two layers which are a phosphorous-doped silicon dioxide film and a silicon dioxide film not doped with phosphorous, and the total thickness of said double-layered silicon dioxide film is not more than 2 $\mu$m.

* * * * *